United States Patent Office 3,460,976
Patented Aug. 12, 1969

3,460,976
CO-DEPOSITION OF BORON CONTAINING COATINGS
Lloyd R. Allen, Belmont, Mass., assignor to National Research Corporation, Newton, Mass., a corporation of Massachusetts
Filed Aug. 17, 1966, Ser. No. 573,002
Int. Cl. C23c 13/02, 1/08; B44d 1/34
U.S. Cl. 117—107                    12 Claims

ABSTRACT OF THE DISCLOSURE

Boron coated films for structural composites reinforcement are made by co-depositing boron and a second material on a film, the second material comprising .05 to 5 atomic percent of the coating and being selected from the group consisting of aluminum, silicon, titanium, zirconium, molybdenum, iron, manganese and their oxides and nitrides.

This invention relates to the production of laminates which include vacuum deposited boron films. These amorphous films of boron, produced by vacuum deposition, are extremely useful for composite structures. The boron provides an excellent reinforcement with high modulus of elasticity relative to weight.

PRINCIPAL OBJECT OF THE INVENTION

It is the principal object of the invention to provide a method of making a superior boron coating for use in boron reinforced composites.

PRIOR ART

The art has long recognized the potential utility of boron as a reinforcing material for structural composites but has failed to achieve commercially practicable methods for making boron reinforced composites. This failure has occurred in spite of intensive research efforts and the expenditure of millions of dollars to develop boron reinforced composites, particularly for aircraft.

It is a particular problem in the composite art to get a high volume percentage of boron into the structure. The common method of producing the boron reinforcement is by thermal decomposition of a boron halide to produce a boron coating on a heated refractory filament (see e.g. U.S. Patents 2,484,519 and 2,839,367). Boron-coated refractory filaments produced by this method are then incorporated into a resin matrix as filaments or comminuted flakes or fibers. These approaches involve complicated lay-up procedures for making high-boron-content composites; also the final product also lacks a proper balance of bend and tensile strengths because of either random or unidirectional, bidirectional, etc., orientation of boron reinforcement therein.

SPECIFIC OBJECTS OF THE INVENTION AND RELATION TO STATE OF THE ART

It is a further object of the present invention to provide a method of making boron reinforced composites which incorporate a substantial volume percentage of boron—in excess of 50%—into the composite structure.

It is a further object of the invention to provide a method of making boron reinforced composites which is based on build-up of laminates and therefore affords ease of composite fabrication and a predictable and well-balanced combination of bend and tensile strengths.

The foregoing objects are accomplished by (1) vacuum deposition of boron on a lightweight, flexible substrate such as polymeric or aluminum film several hundred feet long and (2) adhesively laminating cut sections from such coated substrates together to produce the composite as a thin laminated structure characterized by high rigidity and high strength to weight ratios in the bend and tensile modes. The laminates are characterized by a volume percentage of boron in excess of 50%.

The essential element of the construction is that the boron coatings produced in the vacuum deposition step must be essentially free of cracks over long continuous lengths. The prior art would regard this criterion as generally incompatible with the thickness criterion (boron volume in excess of 50%). This is because vacuum deposited films of boron tend to crack when made in thicknesses in excess of about 0.1 mil. Yet the available useful substrates have minimum thicknesses on the order of .5 to 1 mil. Even if the substrates are coated on two sides (and this adds processing difficulties), the laminate cannot get a sufficiently high volume percentage of boron into the final composite if boron film thickness is to be limited to 0.1 mil per side.

According to the present invention, much thicker films of boron, free of cracks, are made possible. Boron films of a thickness of .5 to 1.0 mil per side can be produced in a crack-free form suitable for laminating into the final product. Lesser thicknesses of coating (.1 to .5 mil), superior to anything in the prior art and also having utility in structural laminates, can also be produced.

It may therefore be stated as a further and specific object of the invention to provide a method of making vacuum deposited films of boron which have a thickness in excess of about half the substrate thickness and are essentially free of cracks and in lengths substantially in excess of 100 feet.

It is a related object of the invention to provide a structural laminate containing layers of boron with a thickness in excess of half a mil.

It is a related object of the invention to provide a boron vacuum-deposition process which affords thick, essentially crack-free, films of boron.

DESCRIPTION

According to the invention a substrate is passed through a vacuum chamber over a heated source of boron. Boron evaporates from the source and condenses on the substrate which is backed up by a cooler surface such as a conventional chill roll. During this boron coating process, a second material is added to the coating. The second material is selected from the group consisting of the elements aluminum, silicon, titanium, zirconium, molybdenum, iron, manganese, and their metallic oxides and nitrides; e.g., $Si_3N_4$, $TiO_2$, $Al_2O_3$. Preferably, the second material is evaporated from a second source during the coating process. However, the second material can also be included in the boron source or introduced to the coating zone via a carrier gas such as a decomposable halide or carbonyl of the second material. The second material can also be added to the boron coating by ion implantation or deposition techniques. The interactions of the above elements with the boron are beneficial, but the mechanisms are different. The aluminum or silicon additions would be dispersed through the coating as a second phase with only a small amount of the addition entering into solid solution with the coating. This would greatly modify the coefficient of thermal expansion. The additions, titanium, zirconium, and molybdenum, would be primarily in solid solution with the boron and increase its thermal and electrical conductivity. The iron and manganese additions would produce both a substantial dispersed second phase and solid solution.

The amount of high conductivity-high expansion metal to be incorporated into the boron coating must be sufficient to substantially reduce the difference in thermal stresses between the boron film and its substrate. Once thickness of the boron film grows over about 0.1 mil, a concentration in the boron coating of at least 0.05 atomic percent of the addition metal is required and at least 0.2% is distinctly advantageous. An upper limit to the concentration of the high conductivity-high expansion metal is imposed by the need to maximize the amount of boron to take advantage of its high rigidity and strength and to keep the boron film continuous. To this end an upper limit of about 5 atomic percent concentration of the high conductivity-high expansion metal within the boron coating is appropriate.

Typically, the concentration of the added material would be about one atomic percent.

A better understanding of the invention and its other objects, features and advantages may be had from the following more detailed description taken in connection with the drawing in which.

Figure 1:
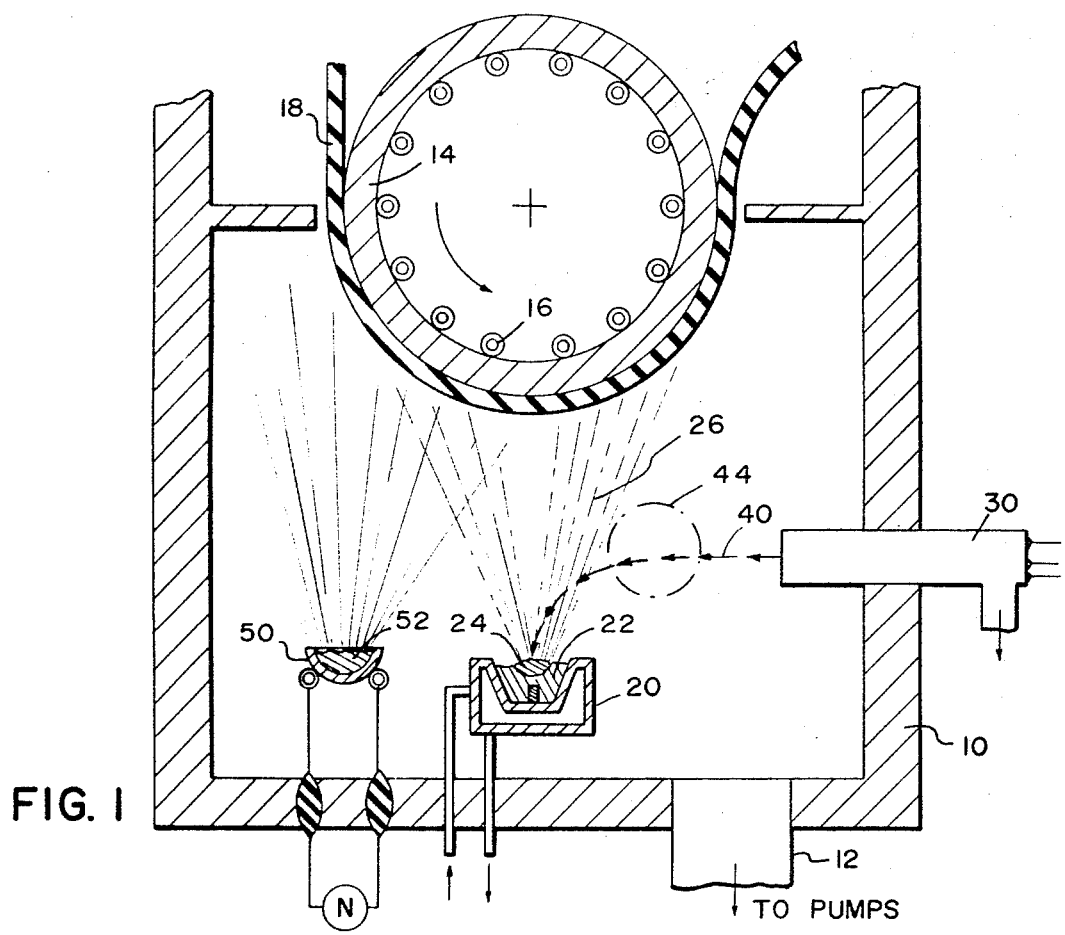
FIG. 1 is a schematic representation partly in section of apparatus, after Simons (U.S. Patent 3,046,936) for practicing the process of the invention.

Referring to FIG. 1, the coating is carried out in a vacuum chamber 10 connected to vacuum pumps via a duct 12. A rotatable chill roll 14, cooled via coolant circulating coils 16, is mounted in the chamber. A flexible substrate 18 is fed along the roll. A source of boron coating vapors 20 is mounted below the substrate. The source has the construction described in the copending application of Allen, S.N. 524,962, filed Jan. 26, 1966, now U.S. Patent No. 3,414,655. The source is heated by a beam 40 from an electron beam gun 30, with a separate pump and ion trap, as described in U.S. Patent 3,046,936 to Simons. A magnet (not shown) produces a field indicated at 44 for bending the electron beam into the boron source 20 to heat the boron charge 22, producing a melt 24 from which boron is evaporated at a high rate to produce the cone of vapor indicated at 26.

A second source 50 contains a charge of aluminum 52. The second source comprises a crucible as described in the patent of Clough et al., 2,665,223, heated by an induction coil and suitable electrical power supply connected to the coil. Alternatively, the aluminum can be heated by direct resistance or a filament heater, or even by electron beam heating (a separate electron gun or periodic deflection of the boron heating electron beam to the aluminum).

Figure 2:
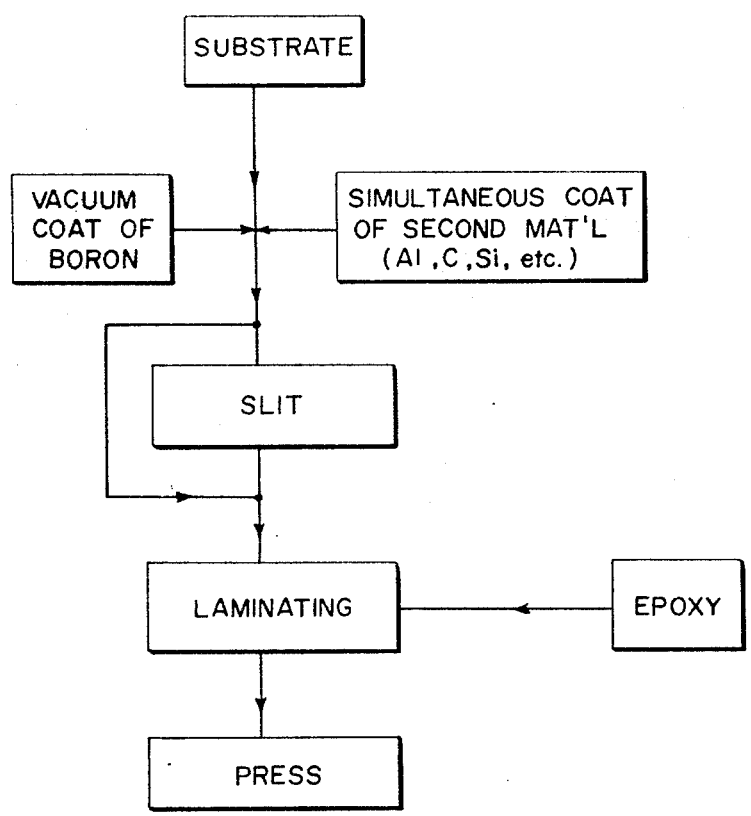
FIG. 2 is a flow chart of the steps of the process.

Referring to FIG. 2, there is shown a flow chart for the process wherein the substrate is first coated heavily and simultaneously coated with the second material to insure a thick crack-free coating. The coated substrate is slit to a convenient size (e.g. inch wide tape) or used as coated. The coated substrates are painted with an adhesive by dipping into a bath comprising an epoxy resin and curing agent and then stacking to get the desired build up (typically 25 layers of boron coated film). Cover sheets of plastic form the outer layer of the laminate. The laminate is put into a press and heated and pressed to bond the adjacent layers of boron coated film.

In the above process the preferred film is a heat resistant polyimide film such as H film which is available in half mil thickness. The preferred speed of the boron film moving past the boron source is about 6 inches per minute with the boron source being located about 14 inches from the film. The power input to the boron should be 15–25 kilowatts to produce a temperature of about 2500° C. The preferred adhesive mix is Epon 827, 828 or 815 with hardener Z and the preferred pressing conditions are a temperature of 350° F. for 4 hours and a pressure of 100–500 p.s.i.

Figure 3:
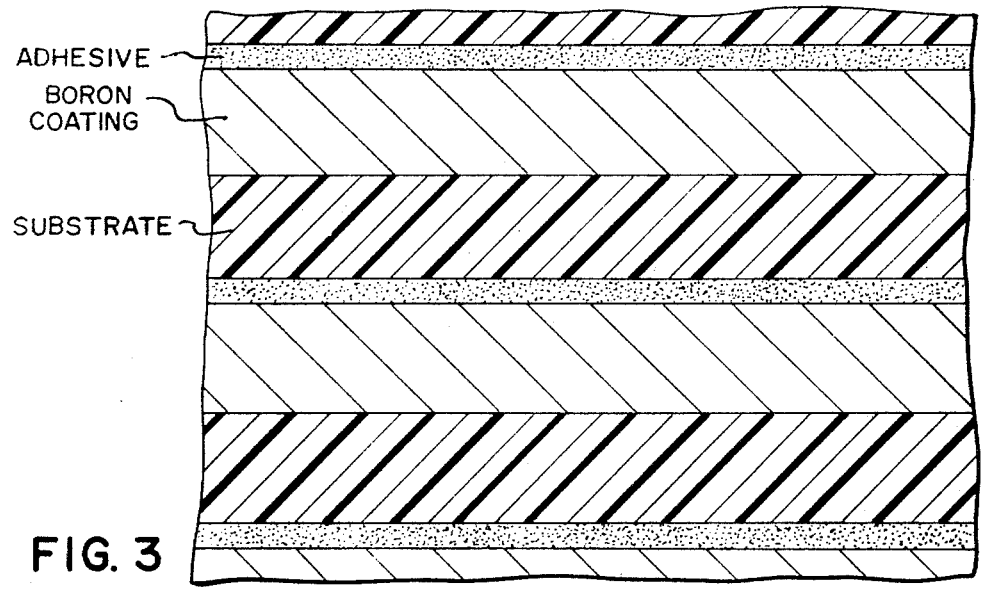
FIG. 3 is a schematic representation of a portion of the finished laminate.

A portion of the laminate is shown in FIG. 3. The boron coatings have a thickness slightly greater than the combined thickness of adhesive and substrate. Where even greater rigidity is desired, it is advantageous to also coat the back surface of the substrate with boron so that the boron volume content in the final laminate is about ⅔ of the total volume.

Typically the density of the finished laminate would be about 2–2.5 grams/cc. Its tensile yield stress would be about 60,000 p.s.i. and its elastic modulus would be about $20-30 \times 10^6$ p.s.i.

This can be compared with a similar bonded laminate of H films or other polyimide, which would have a density of 1.45 gm./cc., tensile yield stress of about 6,250 p.s.i., and modulus of $.3 \times 10^6$ p.s.i.

This can also be compared with a similar bonded laminate of aluminum foil which would have a density of 2.3 gm./cc., tensile yield stress of about 21,000 p.s.i. and elastic modulus of about $8 \times 10^6$ p.s.i.

What is claimed is:

1. A method of making boron coated films comprising the steps of (a) vacuum evaporating boron in the presence of a substrate film to coat the film at a rate so that a coating in excess of 0.1 mil is produced on the film in a single coating pass and (b) simultaneously incorporating a second material into the boron coating to decrease the thermal expansion and contraction gradients across the thickness of the coating, and wherein 0.05 to about 5 atomic percent of said second material is incorporated into the coating and wherein said second material is selected from the group consisting of aluminum, silicon, titanium, zirconium, molybdenum, iron, manganese and oxides and nitrides thereof.

2. The method of claim 1 wherein the second material is selected from the group consisting of aluminum and silicon.

3. The method of claim 1 wherein the second material is selected from the group consisting of titanium, zirconium and molybdenum.

4. The method of claim 1 wherein the second materials is selected from the group consisting of iron and manganese.

5. The method of claim 1 wherein boron and the second material are evaporated from a common source during the deposition step.

6. The method of claim 1 wherein boron and the second material are evaporated from separate sources.

7. A film substrate with an elemental boron coating wherein the boron coating has a total thickness in excess of the substrate thickness and a single side thickness in excess of 0.1 mil, the boron coating on at least one side being essentially free of cracks and containing from 0.05 to about 5 atomic percent of a second material selected from the group consisting of aluminum, silicon, titanium, zirconium, molybdenum, iron, manganese and oxides and nitrides thereof.

8. The boron coated film of claim 7 wherein at least one side of the substrate film has a coating thickness of at least one-half the substrate thickness.

9. The boron coated film of claim 7 wherein the continuously coated film has a length in excess of 100 feet.

10. The boron coated film of claim 7 containing at least 0.2 atomic percent of the second material in the boron coating.

11. The boron coated film of claim 7 wherein the boron coating has a single side thickness in excess of 0.5 mil.

12. The boron coated film of claim 7 wherein the film is a polymer.

References Cited

UNITED STATES PATENTS 3,355,318   11/1967   Jenkin _____ 117—107.2

OTHER REFERENCES

Holland, Vacuum Deposition of Thin Films, 1956, pages 130 and 131 relied upon.

O'Bryan, Rev. Sci. Inst., vol. 5, March 1954, pages 125 and 126 relied upon.

ALFRED L. LEAVITT, Primary Examiner

A. GOLIAN, Assistant Examiner

U.S. Cl. X.R.

117—106, 131, 169; 161—213